Dec. 5, 1939.   C. H. WOODCOCK   2,182,770
CUTTING TOOL
Filed June 21, 1939   2 Sheets-Sheet 1
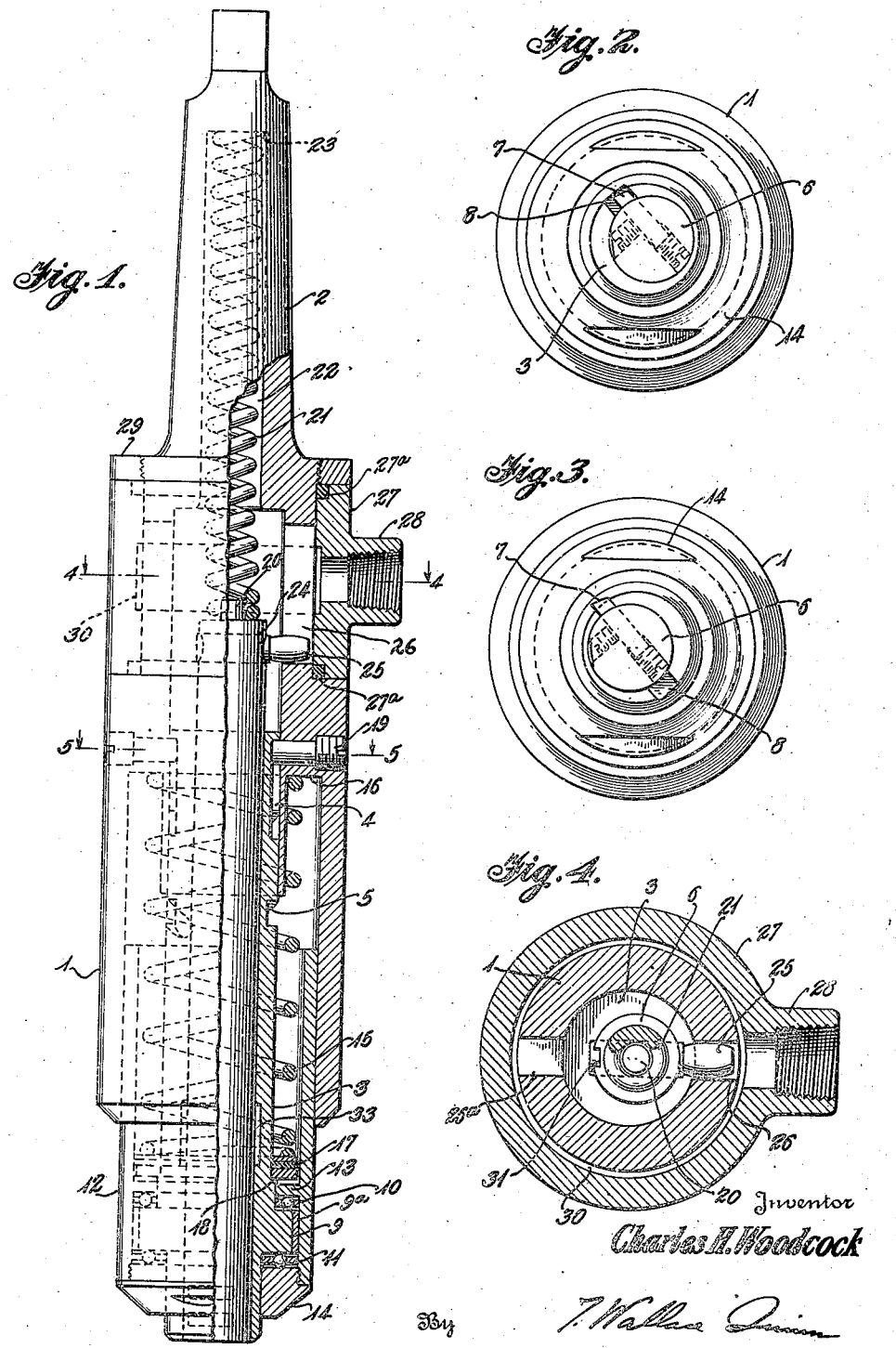
Inventor
Charles H. Woodcock Dec. 5, 1939.  C. H. WOODCOCK  2,182,770
CUTTING TOOL
Filed June 21, 1939  2 Sheets-Sheet 2
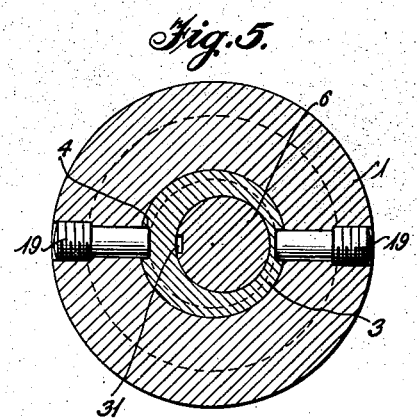
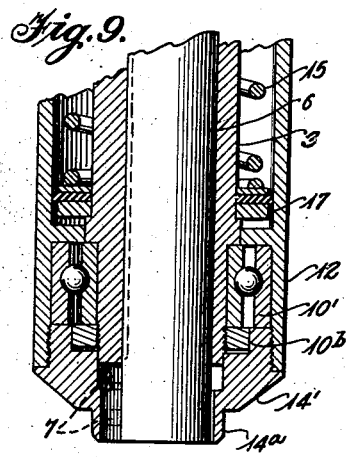
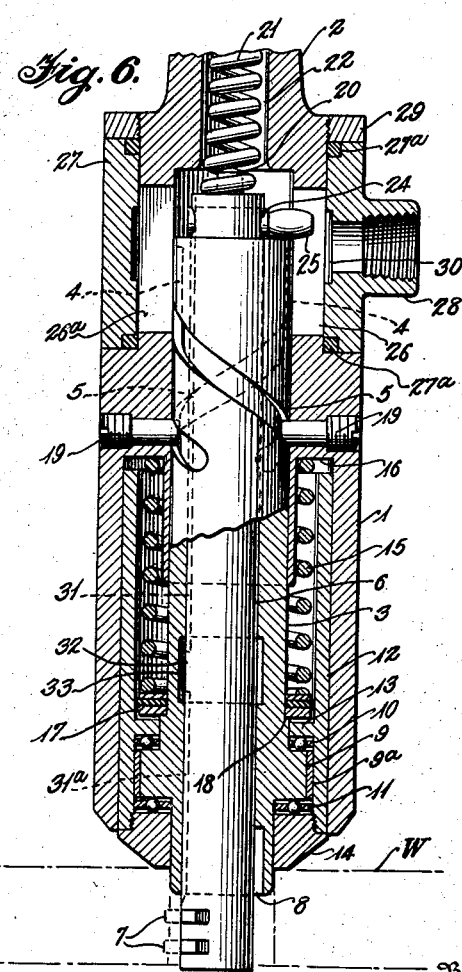
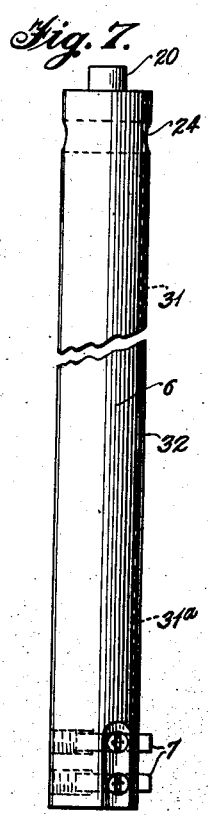
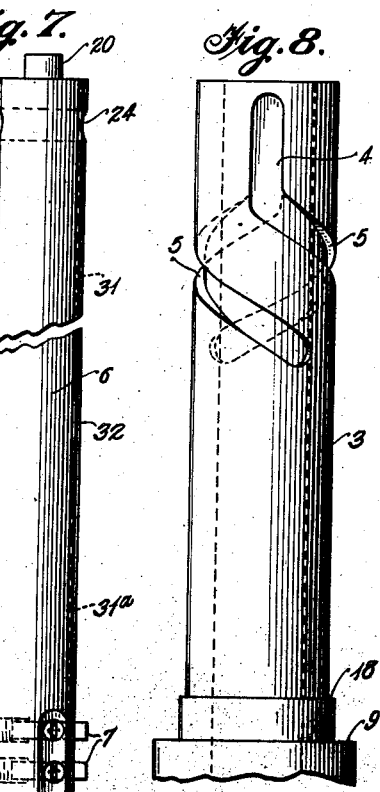
Inventor
Charles H. Woodcock
By
Attorney Patented Dec. 5, 1939

2,182,770

UNITED STATES PATENT OFFICE 2,182,770

CUTTING TOOL

Charles H. Woodcock, Philadelphia, Pa., assignor to The Atlantic Refining Company, Philadelphia, Pa., a corporation of Pennsylvania Application June 21, 1939, Serial No. 280,224

10 Claims. (Cl. 90—15)

The present invention relates to tools adapted to operate upon the inner surfaces of hollow bodies and more particularly to tools for cutting or forming circular recesses upon the inside of tubes, pipes, headers and the like. In certain respects, the present invention relates to improvements in devices of the character of those described in my copending application Ser. No. 187,441, filed January 28, 1938, Patent 2,166,923, July 18, 1939.

An object of my invention is to provide a tool of the character above referred to, adapted to be used in a boring machine of either horizontal, vertical or radial type, or in a lathe or other type of machine in which the piece to be worked upon is moved toward the tool or the tool is moved toward the work piece, or a combination of both.

Another object of my invention is to provide a tool that can be run at higher speeds by reason of a cooling feature forming a part of my invention.

Still another object of my invention is the provision of a tool that is practically fool-proof, in that the cutting elements are fully protected against coming into contact with the piece in which, for example, groves are to be cut, until such time as the tool is properly in place upon the piece to be worked upon.

Other objects and advantages will become apparent from the illustrative embodiment of my invention described below, taken in connection with the accompanying drawings. It will be understood that modifications and variations will readily suggest themselves to those skilled in the art, any and all of which when within the scope of the appended claims, are part and parcel of my invention.

Referring to the drawings, Fig. 1 is a side elevational view with a portion broken away, of a recessing tool for cutting a pair of spaced annular grooves upon the inside of an aperture, as for example, one which previously has been bored in the piece to be worked upon.

Fig. 2 is an end view looking from the bottom of the tool illustrated in Fig. 1, with the tool in the so-called closed position, in which position it is likewise shown in Fig. 1;

Fig. 3 is an end view, also looking from the bottom, with the tool in cutting position;

Fig. 4 is a transverse cross-sectional view taken along line 4—4 of Fig. 1, in the direction indicated by the arrows;

Fig. 5 is a transverse cross-sectional view taken along line 5—5 of Fig. 1, in the direction indicated by the arrows;

Fig. 6 is a fragmentary vertical sectional view showing the relation of the parts of the tool when same is in cutting position;

Fig. 7 is a full view of an element forming a part in the combination shown in the other figures, to which element the cutter blades are attached;

Fig. 8 is a fragmentary view showing the eccentric sleeve at right angles to the position in which it is shown in combination with other elements in Figs. 1 and 6; and, Fig. 9 is a fragmentary portion in section of a modification of certain of the elements of my invention as illustrated in the remaining figures.

Referring more particularly to Figs. 1 to 6, inclusive (the same reference numerals in each of the several figures designating corresponding parts therein), which illustrate a tool embodying novel features of my invention, for cutting a pair of spaced annular grooves upon the inside of an aperture in a work piece W (shown in Fig. 6). Rotation is transmitted to the housing 1, through the extended recessed portion or shank 2, adapted to be fitted, for example, into a boring machine (not shown), driven by a suitable source of power. Telescoping in and adapted to rotate with housing 1, is an inner sleeve 3, having vertical slots 4 on either side thereof, from the lower end of each of which there extends a slot 5 cut diagonally downward in a direction opposite to the direction of rotation of the tool. The inner sleeve 3 is eccentrically bored to receive a shaft 6 to the lower end of which are affixed by set screws or other suitable means, the cutter blades 7. The lower end of the inner sleeve 3 is provided with a slot 8 which encases the cutter blades 7 when the tool is in full inoperative position. (See Figs. 1 and 2.) The inner sleeve 3 is also provided with an outwardly extending annular flange 9, adjacent the lower end thereof, the upper and lower horizontally extending portions of which serve as bearing surfaces which respectively engage with suitable ball bearings 10 and 11, which, as shown, in Figs. 1 and 6, are retained in position by retainer rings. A bronze ring 9a is tightly fitted around the periphery of the annular flange 9 to provide a bearing surface for that portion thereof.

Intermediate the lower enlarged portion of the housing 1 and the inner sleeve 3, there is provided a second sleeve 12, concentrically bored, which telescopically engages with the lower portion of the housing 1. Sleeve 12 is provided with an inwardly extending flange 13, the lower horizontal surface of which serves as a bearing surface with which the bearing 10 engages. The lower end of sleeve 12 is provided with an annular cap member 14, which engages therewith by means of threads. The lower horizontal surface of cap member 14 is adapted to engage the work piece W about the periphery of the aperture within which, for example, grooves are to be cut. The upper horizontal surface of the cap member 14 serves as a bearing surface to be engaged by the bearing 11.

A compression spring 15 is interposed between a shoulder 16 of housing 1 and the uppermost of two rings 17 between which a felt washer is retained. These rings 17 rest upon a slight annular projection 18 upon the inner sleeve 3. The spring 15 tends to push the inner sleeve 3 downwardly, and this force is transmitted through the bearings 10 and 11 to the outer sleeve 12, so that until such force is overcome, as will be pointed out hereinafter, the parts are held by spring 15, in relation to each other, as shown in Figs. 1 and 2.

The housing 1 is provided with two pins 19 threaded through the walls thereof. The inner ends of pins 19 slidably engage with the vertical slots 4 and their diagonal extensions 5 in eccentric inner sleeve 3. While in engagement with slots 4, pins 19 permit only vertical movement of the sleeve 3 and associated parts with respect to housing 1; whereas when in engagement with the diagonal slots or extensions 5 of sleeve 3, the pins 19, in addition to permitting vertical movement, also permit rotary movement of sleeve 3 to a limited extent with respect to housing 1.

Within the eccentric sleeve 3, there is provided a shaft 6 to the lower extremity of which are attached the cutter blades 7. The shaft 6 is provided at its upper end with a reduced portion 20 which serves as a retaining element to hold the compression coil spring 21 in place upon the upper end of said shaft. The spring 21 is disposed within a recess 22 within the shank portion 2 of housing 1 and abuts at its upper end against the end 23 of such recess. The spring 21 tends to push shaft 6 downwardly into the position in which it is shown in Fig. 1. Adjacent its upper end, shaft 6 is provided with an aperture into which is tightly fitted a pin 25 which extends outwardly at right angles to the shaft 6, the extended portion being adapted to ride upwardly and downwardly in the vertical slot provided in housing 1.

About a recessed portion adjacent slot 26 of housing 1, there is disposed a bronze sleeve 27 provided with an extended portion 28 adapted to be threadedly engaged with a pipe (not shown) through which cutting oil or other lubricant or cooling medium may be supplied to the tool, under pressure if necessary. The sleeve 27 is retained upon housing 1 by a ring 29 which engages by means of threads with such housing, and is adapted to permit rotation of the housing 1 with respect to sleeve 27. Suitable packing rings 27a are placed about the upper and lower internal circumferences of sleeve 27, in recesses provided for that purpose. Also the sleeve 27 is provided with an annular internal groove 30 to permit flow of a fluid medium introduced at extension 28, about the entire inner circumferences thereof.

A fluid medium is therefore at all times able to pass to and through the vertical slots 26 and 26a (the latter being a slot corresponding to slot 26, provided in housing 1 at 180 degrees to slot 26), whereupon it may then pass downwardly through groove 31 provided in shaft 6. Groove 31 is interrupted by a projection or dam 32 flush with the normal circumference of shaft 6, below which the groove continues as indicated at 31a, terminating adjacent the upper cutter blade 7. To cooperate with the groove 31, projection 32 and extension 31a, there is provided an internal annular groove 33 in inner sleeve 3. As will be clearly seen from Fig. 6, fluid medium passing downwardly through groove 31, may bypass through internal groove 33 into and through extension 31a, whereupon it may flow upon cutter blades 7, when the tool is in cutting position. When, however, the tool is in so-called closed position, part 32 of shaft 6 is in engagement with the normal internal circumference of sleeve 3 and serves to inhibit or prevent the flow of fluid downwardly to the cutter blades.

The operation of the tool as above described is as follows: At the beginning, the several parts are in relation to each other as shown in Fig. 1, by reason of the action of the compression springs 15 and 21. Having been connected through shank 2 to a suitable means for imparting rotary motion thereto, and the extension 28 of sleeve 27 having been connected to a suitable source of fluid medium, the tool is brought, for example, into position so that the lower horizontal surface of the cap member 14 is in engagement with the outer periphery of the aperture in the work piece W. As pressure sufficient to overcome the force exerted by springs 15 and 21 is applied downwardly, with the cap member 14 abutting against the work piece, and therefore, along with the outer sleeve 12, being held stationary by friction of the cap member against the work piece, the sleeve 12 begins to telescope into the lower recessed portion of housing 1 which is rotating. The rotary motion of housing 1 is transmitted through pin 25, which is slidable vertically in slot 26 of housing 1, to shaft 6. Likewise, rotary motion of housing 1 is imparted through pins 19 in engagement with slots 4 and 5 in inner eccentric sleeve 3, to such sleeve.

As the outer sleeve 12, which is held stationary, telescopes into the housing 1, carrying with it the inner sleeve 3, which is rotating, the pins 19 pass from the upper extremity to the lower extremity of slots 4, thence from the upper extremity to the lower extremity of diagonal slots 5 in inner eccentric sleeve 3. In traveling down the vertical slots 4, pins 19 permit the shaft 6, which is urged downwardly by spring 21, to protrude from the lower end of sleeve 3, as the sleeves 3 and 12 telescope into the lower end of housing 1. When pins 19 reach the lower extremity of slots 4, the shaft 6, whose vertical movement is determined by the sliding of pin 25 in slot 26, has reached the lower extremity of its path of travel. In traveling along the path of the diagonal slots 5, the pins 19 serve to impart restricted rotary motion of said sleeve with respect to housing 1, so that, whereas at the beginning of the downward travel of pins 19 through slots 5, the vertical axis of shaft 6 within sleeve 3 is spaced from the vertical axis of housing 1, by the time the lower extremity of such path of travel has been reached, in view of the eccentric bore of sleeve 3 within which shaft 6 rotates, the vertical axis of shaft 6 has passed to the opposite side of the vertical axis of housing 1. The movement, as just described, is responsible for movement of the cutter blades 7 downwardly, and outwardly into engagement with the work piece W to be grooved. As will be seen, the rate of movement of the shaft 6 downwardly and horizontally, is dependent upon the rate at which a downward force is applied to the housing 1. It will be understood that the reverse operation takes place when the force applied downwardly upon the housing 1 is released to an extent that the normal forces of springs 15 and 21 may exert themselves.

In the modification of certain parts shown in Fig. 9, the bearings 10 and 11 and bushing 9a, as shown in Figs. 1 and 6, have been replaced by a single bearing 10' which is adapted to take both vertical and radial thrusts. The inner race of bearing 10' is held in place on sleeve 3 by ring 10b and the outer race of such bearing is held in place in sleeve 12 by annular cap member 14'. It will be noted in this modification that inner sleeve 3 terminates just above the upper cutter blade 7, and that a guiding shoulder or extension 14a integral with cap member 14, is provided, the internal diameter of the bore in the extension and cap member being large enough to accommodate the cutter blades when the shaft 6 is in full inoperative position.

As will be apparent from the description of the illustrative embodiment given above, my invention is susceptible of embodiment in numerous forms. For example, recessing elements other than cutter blades such as described above, may be employed for operating upon the interior walls of apertures or other surfaces. Abrasive wheels, forming rollers, burnishing or polishing wheels, flanging rollers, lapping tools or the like may be substituted for the cutter blades, in instances where other types of elements may be used to advantage. Nor is the device necessarily restricted for use with cylindrical apertures or tubular bodies, but may also be employed for recessing the interior walls of other hollow bodies. It may be used for spot facing, for example.

What I claim is:

1. An internal recessing machine comprising a housing adapted to rotate about a fixed axis, a shaft journaled within said housing and eccentric thereto, a recessing element mounted upon said shaft, an inner sleeve surrounding said shaft eccentric thereto and concentric to said housing, an outer sleeve surrounding said inner sleeve and concentric to said inner sleeve and said housing, said sleeves being longitudinally slidable within said housing, means associated with said shaft and said housing for insuring unitary rotation of said shaft with said housing, and means associated with said inner sleeve and said housing for changing the eccentricity of said shaft with respect to said housing.

2. An internal recessing machine comprising a housing adapted to rotate about a fixed axis, a shaft journaled within said housing and eccentric thereto, a recessing element mounted upon said shaft, an inner sleeve surrounding said shaft eccentric thereto and concentric to said housing, an outer sleeve surrounding said inner sleeve and concentric to said inner sleeve and said housing, said sleeves being longitudinally slidable within said housing and at least one of said sleeves being longitudinally slotted to receive said recessing element when inoperative, means associated with said shaft and said housing for insuring unitary rotation of said shaft with said housing, and means associated with said inner sleeve and said housing for changing the eccentricity of said shaft with respect to said housing.

3. An internal recessing machine comprising a housing adapted to rotate about a fixed axis, means associated with said housing for introducing a cutting fluid into the upper portion thereof, a shaft journaled within said housing and eccentric thereto, a recessing element mounted upon said shaft, a longitudinal channel in said shaft terminating adjacent said recessing element, a dam interrupting said channel at one portion along the length thereof, an inner sleeve surrounding said shaft eccentric thereto and concentric to said housing, an annular recess in said inner sleeve cooperating with the channel and dam of said shaft to permit flow of cutting fluid from the upper portion of said housing to said recessing element when operative, an outer sleeve surrounding said inner sleeve and concentric to said inner sleeve and said housing, said sleeves being longitudinally slidable within said housing and at least one of said sleeves being longitudinally slotted to receive said recessing element when inoperative, means associated with said shaft and said housing for insuring unitary rotation of said shaft with said housing, and means associated with said inner sleeve and said housing for changing the eccentricity of said shaft with respect to said housing.

4. An internal recessing machine comprising a housing adapted to rotate about a fixed axis, a shaft journaled within said housing and eccentric thereto, a recessing element mounted upon said shaft, an inner sleeve surrounding said shaft and eccentric thereto, an outer sleeve surrounding said inner sleeve and concentric to said inner sleeve and said housing, said sleeves being longitudinally slidable within said housing, the end of one of said sleeves providing a guide member adapted to loosely fit within and position the work being operated upon and being longitudinally slotted to receive said recessing element when inoperative, means associated with said shaft and said housing for insuring unitary rotation of said shaft with said housing, and means associated with said inner sleeve and said housing whereby upon longitudinal sliding movement of the sleeves within said housing a change in the angular relationship between said inner sleeve and said housing is effected, thereby to change the eccentricity of said shaft with respect to said housing, and an abutment upon the outer sleeve to be engaged by the work piece to be operated upon.

5. An internal recessing machine comprising a housing adapted to rotate about a fixed axis, a shaft journaled within said housing and eccentric thereto, a recessing element mounted upon said shaft, an inner sleeve surrounding said shaft eccentric thereto and concentric to said housing, an outer sleeve surrounding said inner sleeve and concentric to said inner sleeve and said housing, said sleeves being longitudinally slidable within said housing and at least one of said sleeves being longitudinally slotted to receive said recessing element when inoperative, means associated with said housing, said inner sleeve, and said shaft for supplying cutting fluid to said recessing element, means associated with said shaft and said housing for insuring unitary rotation of said shaft with said housing, and means associated with said inner sleeve and said housing for changing the eccentricity of said shaft with respect to said housing.

6. An internal recessing machine comprising a housing adapted to rotate about a fixed axis, a shaft journaled within said housing and eccentric thereto, a recessing element mounted upon said shaft, an inner sleeve surrounding said shaft and eccentric thereto, an outer sleeve surrounding said inner sleeve and concentric to said inner sleeve and said housing, said sleeves being longitudinally slidable within said housing and at least one of said sleeves being longitudinally slotted to receive said recessing element when inoperative, means associated with said shaft and said housing for insuring unitary rotation of said shaft with said housing, means for changing the eccentricity of said shaft with respect to said housing, said means comprising a slot in said inner sleeve extending longitudinally of said sleeve and continuing diagonally of said sleeve in a direction opposite to the direction of rotation of said sleeve and a pin affixed to said housing and slidably engageable with the aforesaid slot, said last mentioned means being so constructed and arranged that upon longitudinal sliding movement of the sleeves within the housing there is effected a change in the angular relationship between said inner sleeve and said housing and thereby a change in the eccentricity of said shaft with respect to said housing, and an abutment upon the outer sleeve to be engaged by the work piece to be operated upon.

7. An internal recessing machine comprising a housing, adapted to rotate about a fixed axis, means associated with said housing for introducing a cutting fluid into the upper portion thereof, a shaft journaled within said housing and eccentric thereto, a recessing element mounted upon said shaft, a longitudinal channel in said shaft terminating adjacent said recessing element, a dam interrupting said channel at one portion along the length thereof, an inner sleeve surrounding said shaft and eccentric thereto, an annular recess in said inner sleeve cooperating with the channel and dam of said shaft to permit flow of cutting fluid from the upper portion of said housing to said recessing element when operative, an outer sleeve surrounding said inner sleeve and concentric to said inner sleeve and said housing, said sleeves being longitudinally slidable within said housing and at least one of said sleeves being longitudinally slotted to receive said recessing element when inoperative, means associated with said shaft and said housing for insuring unitary rotation of said shaft with said housing, means for changing the eccentricity of said shaft with respect to said housing, said means comprising a slot in said inner sleeve extending longitudinally of said sleeve and continuing diagonally of said sleeve in a direction opposite to the direction of rotation of said sleeve and a pin affixed to said housing and slidably engageable with the aforesaid slot, said last mentioned means being so constructed and arranged that upon longitudinal sliding movement of the sleeves within the housing there is effected a change in the angular relationship between said inner sleeve and said housing and thereby a change in the eccentricity of said shaft with respect to said housing, and an abutment upon the outer sleeve to be engaged by the work piece being operated upon.

8. An internal recessing machine comprising a housing adapted to rotate about a fixed axis, said housing having a hollow shank portion and being recessed to accommodate longitudinally slidable inner and outer sleeves, a shaft disposed within said housing and provided adjacent the upper end with a pin and adjacent the lower end with a recessing element, a longitudinal slot in the wall of said housing to accommodate said pin, said pin functioning to insure unitary rotation of said shaft with said housing, an inner sleeve surrounding said shaft and eccentric thereto, said inner sleeve having a slot adjacent the upper end extending longitudinally of said sleeve and continuing diagonally in the direction opposite to the direction of rotation of said sleeve, a pin affixed to said housing and extending inwardly into slidable engagement with said slot, said pin and said slot cooperating to change the eccentricity of the inner sleeve and the shaft with respect to said housing, a flanged portion adjacent the lower end of said inner sleeve, an outer sleeve surrounding said inner sleeve and having an internal shoulder adjacent the lower end thereof, a longitudinal slot in said inner sleeve to receive said recessing element when inoperative, a cap member affixed to the lower end of said outer sleeve, said cap member having an aperture to accommodate the lower end of said shaft carrying the recessing element, a bearing member intermediate the inner and outer sleeves and cooperating with said inner sleeve flange, said outer sleeve internal shoulder, and said cap member to take up the radial and longitudinal thrust of the shaft and inner sleeve, and springs urging the sleeves and shaft in a direction within said casing such as to project said sleeves and shaft outwardly thereof.

9. An internal recessing machine comprising a housing adapted to rotate about a fixed axis, said housing having a hollow shank portion and being recessed to accommodate longitudinally slidable inner and outer sleeves, a shaft disposed within said housing and provided adjacent the upper end with a pin and adjacent the lower end with a recessing element, a longitudinal slot in the wall of said housing to accommodate said pin, said pin functioning to insure unitary rotation of said shaft with said housing, an inner sleeve surrounding said shaft and eccentric thereto, said inner sleeve having a slot adjacent the upper end extending longitudinally of said sleeve and continuing diagonally in the direction opposite to the direction of rotation of said sleeve, a pin affixed to said housing and extending inwardly into slidable engagement with said slot, said pin and said slot cooperating to change the eccentricity of the inner sleeve and the shaft with respect to said housing, a flanged portion adjacent the lower end of said inner sleeve, an outer sleeve surrounding said inner sleeve and having an internal shoulder adjacent the lower end thereof, a cap member affixed to the lower end of said outer sleeve, said cap member having an aperture to accommodate the lower end of said shaft carrying the recessing element and a slot to receive said recessing element when inoperative, a bearing member intermediate the inner and outer sleeves and cooperating with said inner sleeve flange, said outer sleeve internal shoulder, and said cap member to take up the radial and longitudinal thrust of the shaft and inner sleeve, and springs urging the sleeves and shaft in a direction within said casing such as to project said sleeves and shaft outwardly thereof.

10. An internal recessing machine comprising a housing adapted to rotate about a fixed axis, said housing having a hollow shank portion and being recessed to accommodate longitudinally slidable inner and outer sleeves, a shaft disposed within said housing and provided adjacent the upper end with a pin and adjacent the lower end with a recessing element, a longitudinal slot in the wall of said housing to accommodate said pin, said pin functioning to insure unitary rotation of said shaft with said housing, an inner sleeve surrounding said shaft and eccentric thereto, said inner sleeve having a slot adjacent the upper end extending longitudinally of said sleeve and continuing diagonally in a direction opposite to the direction of rotation of said sleeve, a pin affixed to said housing and extending inwardly into slidable engagement with said slot, said pin and said slot cooperating to change the eccentricity of the inner sleeve and the shaft with respect to said housing, means associated with said housing for introducing a cutting fluid into the upper portion thereof, a longitudinal channel in said shaft terminating adjacent said recessing element, a dam interrupting said channel at one portion along the length thereof, an annular recess in said inner sleeve surrounding said shaft, said recess cooperating with said channel and said dam to permit flow of cutting fluid from the upper portion of said housing to said recessing element when operative, a flanged portion adjacent the lower end of said inner sleeve, an outer sleeve surrounding said inner sleeve and having an internal shoulder adjacent the lower end thereof, a longitudinal slot in said inner sleeve to receive said recessing element when inoperative, a cap member affixed to the lower end of said outer sleeve, said cap member having an aperture to accommodate the lower end of said shaft carrying the recessing element, a bearing member intermediate the inner and outer sleeves and cooperating with said inner sleeve flange, said outer sleeve internal shoulder, and said cap member to take up the radial and longitudinal thrust of the shaft and inner sleeve, and springs urging the sleeves and shaft in a direction within said casing such as to project said sleeves and shaft outwardly thereof.

CHARLES H. WOODCOCK.